No. 779,235. PATENTED JAN. 3, 1905.
W. T. NICHOLLS.
GLASS POT FURNACE.
APPLICATION FILED APR. 29, 1904.

3 SHEETS—SHEET 1.

WITNESSES

INVENTOR
W. T. Nicholls
by Bakewell & Byrnes
his Attorneys

No. 779,235.

PATENTED JAN. 3, 1905.

W. T. NICHOLLS.
GLASS POT FURNACE.
APPLICATION FILED APR. 29, 1904.

3 SHEETS—SHEET 3.

No. 779,235.

Patented January 3, 1905.

UNITED STATES PATENT OFFICE.

WILLIAM T. NICHOLLS, OF WELLSBURG, WEST VIRGINIA.

GLASS-POT FURNACE.

SPECIFICATION forming part of Letters Patent No. 779,235, dated January 3, 1905.

Application filed April 29, 1904. Serial No. 205,568.

*To all whom it may concern:*

Be it known that I, WILLIAM T. NICHOLLS, of Wellsburg, Brooke county, West Virginia, have invented a new and useful Glass-Pot Furnace, of which the following is a full, clear, and exact description, reference being had to the accompanying drawings, forming part of this specification, in which—

Figure 1:
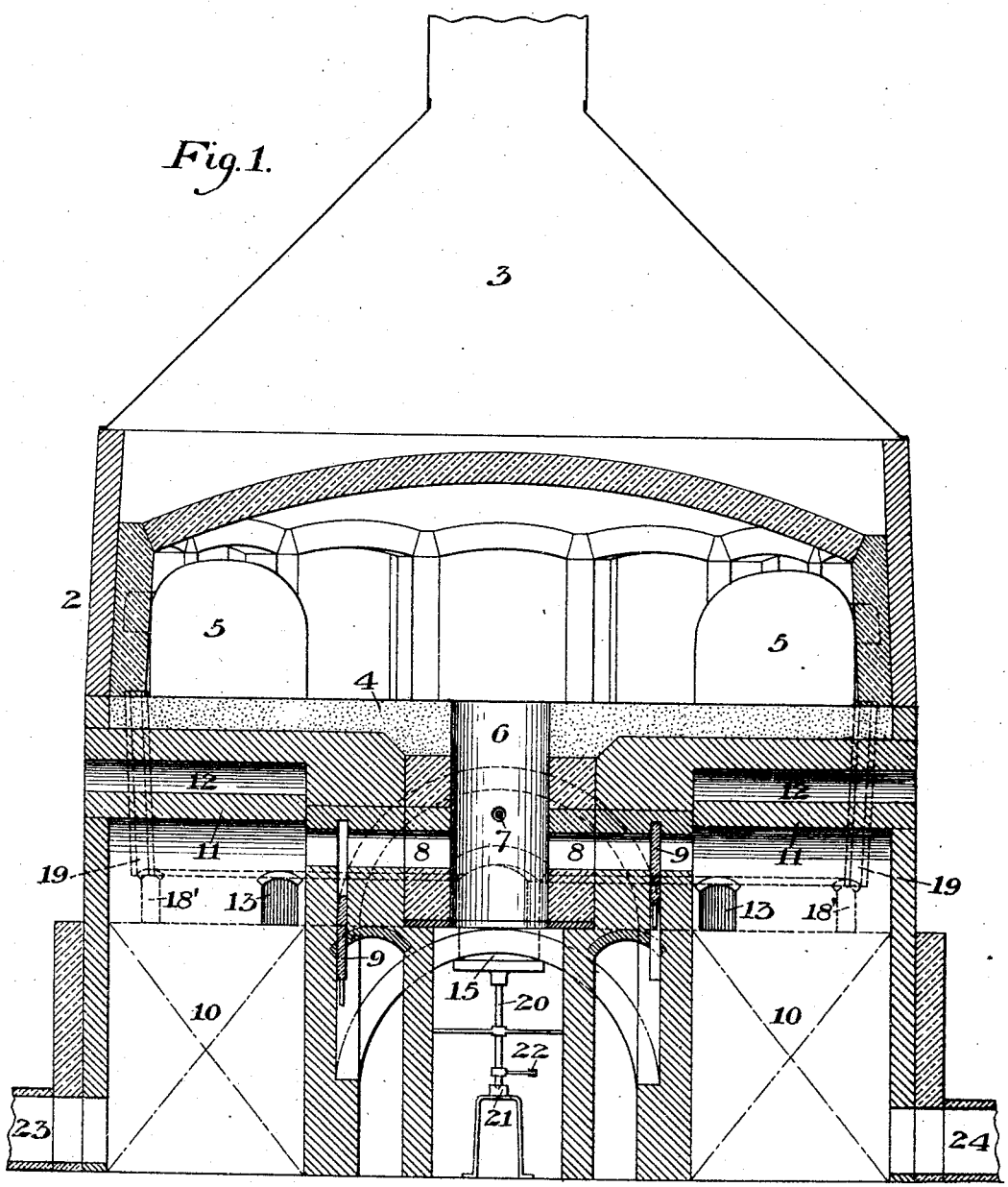
Figure 2:
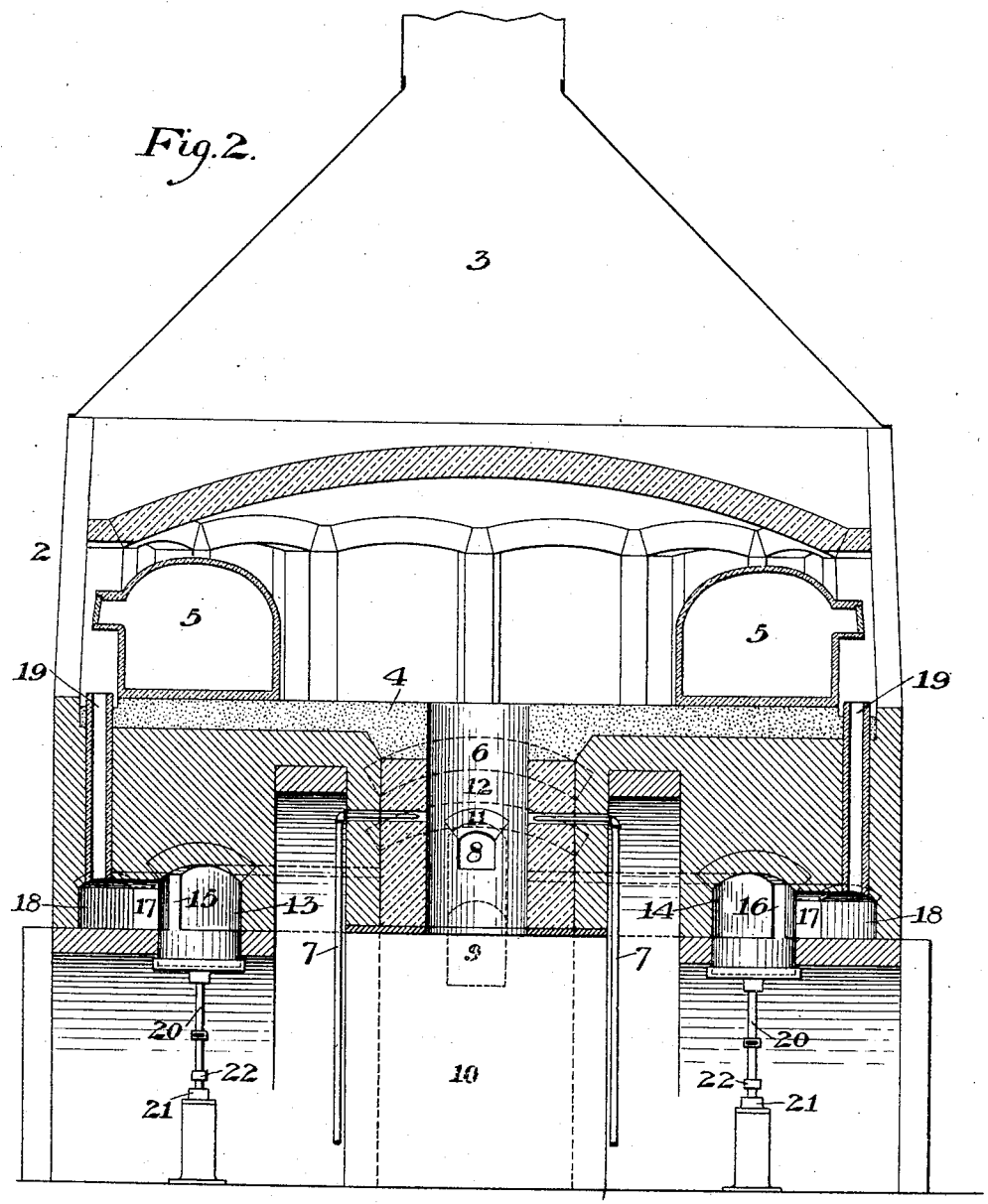
Figure 3:
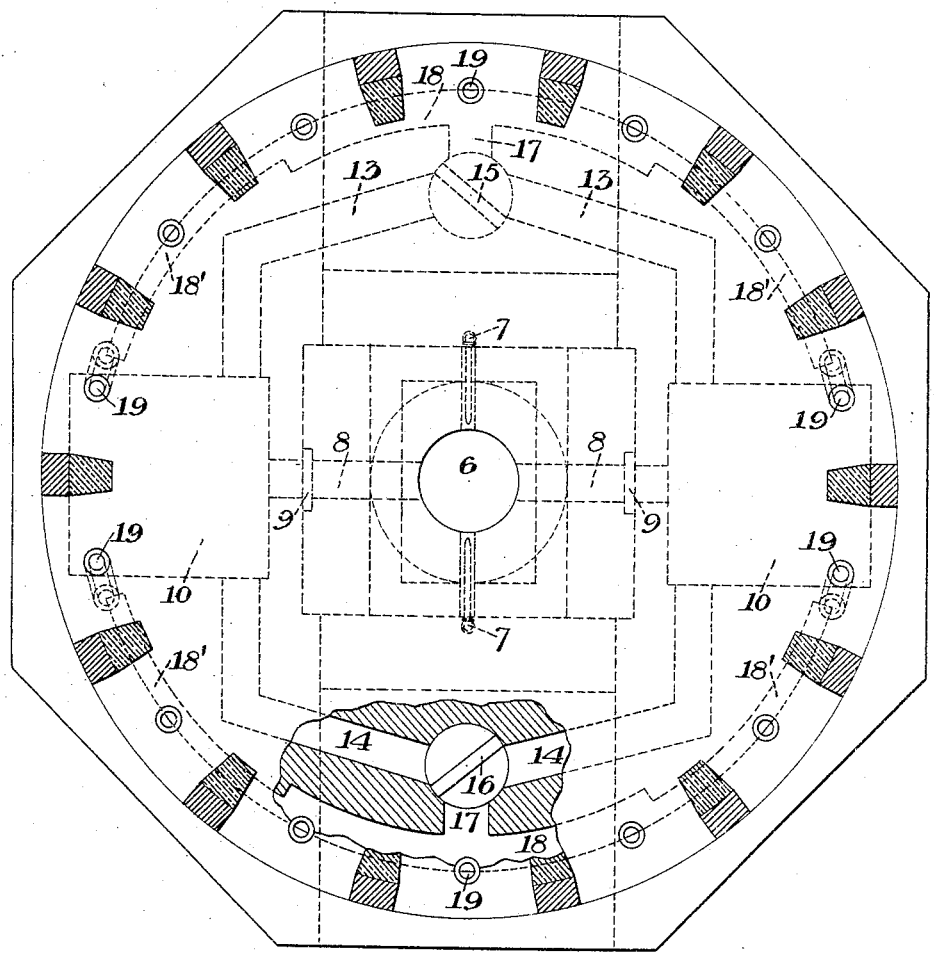

Figure 1 is a vertical central section of my improved furnace, taken through the regenerators. Fig. 2 is a similar section at right angles to Fig. 1. Fig. 3 is a plan view of the bench, partially broken away to show the valves.

My invention relates to the class of regenerative glass-pot furnaces, and is designed to provide an economical furnace in which each pot shall be more evenly heated than heretofore and a single eye may be employed, through which the air and gas continuously enter the furnace. Heretofore in this type of furnace there have been a plurality of ports entering the furnace, the mixture alternately entering the different ports and the products alternately passing out through the fluid-inlet ports. In this type of furnace the pots are unevenly heated, being subjected to much greater heat on their back than in the other portions. This makes the glass uneven in color and causes the pots to wear out rapidly. It is also wasteful of gas. My invention overcomes this difficulty; and it consists in continuously feeding the air-and-gas mixture through the same eye while reversing the regenerators in the ordinary manner. It also consists in providing offtake-flues in such a manner that the heat is more evenly supplied around the pot, giving a more even color and greater economy in the gas.

In the drawings, 2 represents a pot-furnace, having the roof 3, the circular bench 4, and the pots 5 arranged in a row around the bench. 6 is a central eye leading upwardly at the center of the bench and through which the gas and air enter the furnace at all times. The gas is shown as entering the eye through opposite pipes 7, the pipes leading through holes at opposite sides of the eye and terminating short of the inner ends of the holes, so that any glass dropping through the eye will not contact with the gas-pipe. The hole and gas-pipe form a burner, the air flowing up from below and mixing with the gas, the mixture igniting within the eye and flowing up into the furnace. The air flows into the eye through the flues 8 8, one of which is open while the other is closed. These flues are controlled by vertical movable dampers 9, which are preferably formed of refractory slabs sliding vertically in the masonry of the walls. These two valves are preferably connected to counterweight each other and make their movement easier. The flues 8 8 lead into the upper ends of the regenerators 10 10, having the arched roofs 11. Between the covering-arches 11 of the regenerators and the bench of the furnace I preferably provide air-cooling chambers 12, which are open at their outer ends. If any glass works down through the bench, it will chill on entering this air-chamber, which thus prevents it from eating down into the regenerator and keeps the top arch of the regenerator cool.

Each regenerator is connected through horizontal flues 13 and 14 with reversing-valves 15 and 16. These reversing-valves also lead into flues 17 from semicircular flues 18, the ends of which terminate at the regenerator-chambers. The bench is provided with downwardly-extending tile flues 19, which lead from the front of the pots down into the semicircular channels 18'. To make the draft more even through these different downtake-flues, I preferably enlarge the semicircular channels near the port 17, the part 18' being smaller in cross-section.

The valves 15 and 16 preferably consist of vertical slabs rising from a circular base, which rests on stem 20, carried in a step-bearing 21. The stem is provided with a handle 22, by which it is turned, and the valve-handles may be connected so that one will be shifted with the other.

The products of combustion pass out from the regenerators through the flues 23 and 24, through which the air alternately enters the regenerators, external reversing-valves of the ordinary type being used to connect these flues alternately to stack and to the open air.

In the operation of the furnace with the valves as shown the air flows in through flue 23, passes up through the regenerator and becomes heated, and flows in through channel 8 into the eye, where it combines with the gas, the mixture igniting and flowing up through the eye into the furnace. The products of combustion are drawn down through the annular set of downtake-flues into the semicircular channels 18, whence they flow through the ports 13 and 14 into the top of the regenerator 10, whence they pass out to the stack through the flue 24. When the heat of the regenerator has been reduced as much as desirable, the valves 15 and 16 are reversed, the position of the valves 9 is reversed, and the external reversing-valves are shifted. The air will then flow in through the flue 24 and the products pass out through the flue 23.

The advantages of my invention result from the use of a single eye through which the fuel mixture enters the furnace with the reversing system. This allows the space on the bench to be entirely taken up by the pots and brings the eye to the center of the furnace. The use of the outer row of downtake-flues draws the products outwardly in fan shape throughout the circle of the pots. The products thus envelop all parts of the pots as they pass to the downtake-flues, heat the pots evenly throughout their surface, and prevent uneven heating of the glass in the pot. This gives a more even color in the glass and also produces greater economy in the heat. The reversing system gives the usual advantages of the regenerative furnace while the reversing does not interfere with the continuous entry of the mixture through the same port or eye.

The gas may be passed through regenerators to heat it as well as the air, and many other variations may be made in the form and arrangement of furnace, the regenerators, the valves, flues, &c., without departing from my invention.

I claim—

1. A regenerative glass-pot furnace having a central eye arranged to admit heated gases to the furnace, means for continuously feeding the mixture forwardly through said eye, single-surface regenerators, means for heating the air in the regenerators, and means for reversing the air-currents alternately through the regenerators; substantially as described.

2. A regenerative glass-pot furnace having an inlet-port, means for continuously supplying the fuel through said port, single-surface regenerators, means for reversing the flow of the products through the regenerators, and an outer row of downtake-flues for the products arranged to distribute them over the pots; substantially as described.

3. A regenerative glass-pot furnace of circular form having a central eye, means for feeding fuel mixture upwardly continuously through said eye, downtake-flues at different points around the furnace, single-surface regenerators, and means for reversing the products through the regenerators; substantially as described.

4. A regenerative glass-pot furnace having a central eye, means for continuously feeding a fuel mixture upward through the eye, a series of outer downtake-flues for the products of combustion leading through the bench, curved flues to which the downtake-flues lead, single-surface regenerators and reversible connections between the curved flues and the regenerators; substantially as described.

5. A regenerative glass-pot furnace having a supply-port, air-channels leading into said supply-port, valves arranged to alternately supply heated air through first one and then the other of said air-channels, single-surface regenerators, and means for reversing the products of combustion through the regenerators; substantially as described.

6. A regenerative glass-pot furnace having a single central eye, means for feeding gas and air into said eye, single-surface regenerators, means for passing the air through a regenerator, and means for reversing the air-current and the products of combustion through the regenerators; substantially as described.

In testimony whereof I have hereunto set my hand.

WILLIAM T. NICHOLLS.

Witnesses:
H. F. RYMER,
S. M. NEASE.